Oct. 18, 1960 W. FROEDE ET AL 2,956,554
METHOD OF COOLING ROTARY PISTON INTERNAL COMBUSTION ENGINES
Filed March 18, 1957
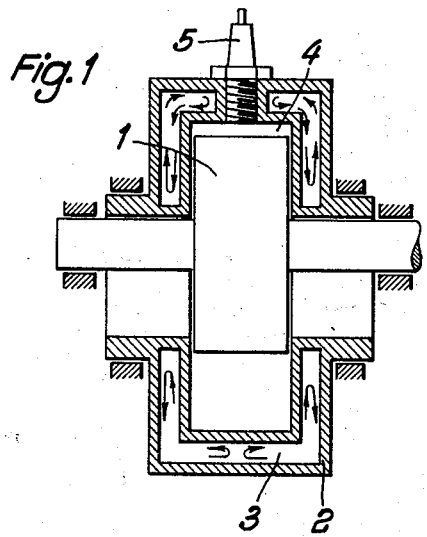
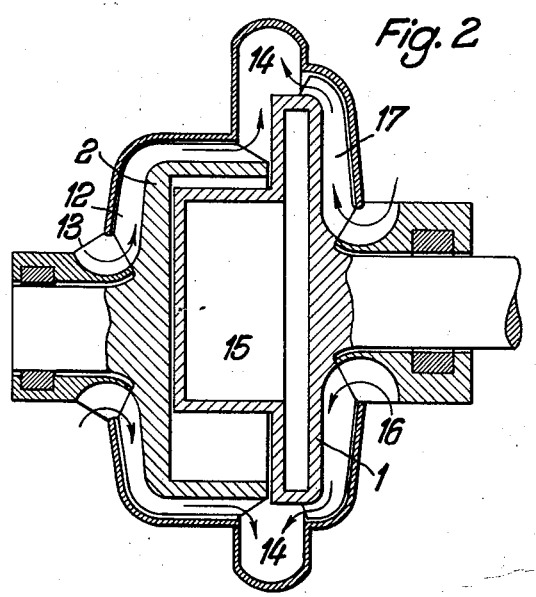
Inventors
W. Froede
F. Wankel
E. Hoeppner United States Patent Office
2,956,554
Patented Oct. 18, 1960

2,956,554

METHOD OF COOLING ROTARY PISTON INTERNAL COMBUSTION ENGINES

Walter Froede, Neckarsulm, and Felix Wankel and Ernst Hoeppner, Lindau (Bodensee), Germany, assignors to NSU Werke Aktiengesellschaft, Neckarsulm, Wurttemberg, and Felix Wankel, Lindau (Bodensee), Germany Filed Mar. 18, 1957, Ser. No. 646,845

2 Claims. (Cl. 123—8)

The invention relates to a method of cooling rotary internal combustion engines. The usual distinction between internal combustion engines is that between air-cooled and liquid-cooled engines. Both cooling systems usually require some type of ancillary equipment for circulating the coolants that are required to carry away the heat. Apart from thermally induced circulation use is generally made of water circulating pumps or air fans.

The present invention further relates to a method of cooling rotary internal combustion engines of the type disclosed in prior filed application Serial Number 646,572, filed March 18, 1957, now U.S. Patent No. 2,833,763 in the names of Felix Wankel and Ernst Hoeppner, and entitled "Rotary Piston Four-Stroke-Cycle Internal Combustion Engine."

In the case of such rotary engines methods of cooling can be employed which differ from above-mentioned conventional methods of circulating a coolant.

Accordingly, the present invention has for an object to provide a method of cooling, such rotary engine including utilizing the centrifugal force developed by at least one of the rotating rotors in conjunction with a thermosyphon effect to circulate a volume of liquid within the said rotor and thus to distribute the heat.

The method contemplated by the invention is adapted more particularly to the form of construction of a rotary internal combustion engine in which ignition and combustion always occur at the same place in the engine or rotor and thus set up localised thermal gradients of considerable magnitude. Other parts of the engine are cooled and scavenged by the fresh charge introduced in the course of each cycle. Consequently, the rotor in such an engine develops pronounced high and low temperature spots. These temperature gradients create very high stresses in parts of the engine and they present considerable difficulties in providing for an efficient and uniform dissipation of the heat by a liquid or air cooling system.

The present invention provides a method of producing a more favourable distribution of the heat. Heat is transferred for instance from the hot walls of the combustion chamber to the cooled outer walls by the effect of the centrifugal field. More specifically, the invention includes distributing the heat substantially uniformly from the zone of highest temperature throughout the remaining surfaces of at least one of the rotors.

Optimum cooling conditions are thereby created which permit the heat distributing effect of the liquid to be supplemented by a flow-type cooling system for conveying away the heat from outside the volume of liquid.

The method according to the invention cannot be compared with that employed in rotary piston engines in which the speed of revolution of the piston is utilised to generate a current of air. These known methods merely propose to dissipate heat and are not concerned with its distribution.

The method proposed by the invention affords the further special advantage that no sealing means are required for admission and return pipes, that no pumping effort is required to convey the liquid, and that the effect of a liquid cooling system inside the engine can be combined with the convection effect of centrifugally generated currents of air.

It is also within the scope of the invention to introduce the cooling air current into the exhaust gas stream for the purpose of creating an exhaust gas-cooling air mixture of correspondingly lower temperature.

The principle that underlies the proposed method of cooling is illustratively hereinafter described with reference to the accompanying drawings in which Fig. 1 is a diagrammatical view partly in section and partly in elevation and illustrating the method of heat distribution in a centrifugal field due to the thermosyphon effect;

Fig. 2 is a similar view illustrating a direct and indirect air cooling system in which the centrifugal field is used to act as a blower.

Fig. 1 diagrammatically shows the inner rotor 1 and the outer rotor 2 of an "internal shaft" rotary internal combustion engine such as disclosed in said prior filed application, Serial Number 646,752. The outer rotor is provided with a closed cooling jacket 3 in which the liquid coolant will circulate in the direction shown by the arrows. The combustion chamber 4 with the spark plug 5 may be considered as being the heat source which principally raises the temperature of those parts of the engine which are radially more remote from the axis. The circulatory current in the centrifugal field distributes the heat over the entire outside surface.

Fig. 2 illustrates an example of a direct and an indirect air cooling system. The outer rotor 2 is equipped with external scoop-like cooling fins 12 which create a current of air to flow from inlet 13 to discharge ring 14 and thereby cause a withdrawal of heat from the outer surface of rotor 2. The inner rotor 1 is cooled, for instance, indirectly. The liquid enclosed in the chamber 15 circulates in contact with the interior surfaces of the rotor and distributes the heat substantially uniformly throughout the interior rotor surfaces. A heat dissipating air current is drawn into the casing by the scoop-like cooling ribs 17 in the exterior of the rotor so that this cooling air current flows from the inlet point denoted at 16 over the external surfaces of the rotor and into the discharge ring 14.

It is, therefore, clear that the present invention provides for the cooling of a rotary internal combustion engine of the type in which an outer rotor surrounds an inner rotor and defines in combination therewith, and upon relative rotary movement thereof at least one variable volume working chamber. A body of liquid coolant medium is completely closed within at least one of the rotors. The engine is operated and heat which is generated in the surfaces of the rotor having the liquid therewithin to a higher degree in those surfaces adjacent the ignition point is transferred to the liquid and distributed throughout the remaining surfaces of that rotor in contact with the liquid by a combination of centrifugal force exerted on the liquid due to rotation and by circulation of liquid within the rotor due to the differences in the specific weight of that portion of the liquid adjacent the ignition point, in comparison with that portion of the liquid remote from the ignition point. Further, the heat which has been distributed substantially uniformly throughout the rotor surfaces is dissipated from those rotor surfaces opposite to those contacting the liquid.

What we claim is:

1. A rotary internal combustion engine comprising an outer member having a cavity therein; an inner member supported within said cavity with its axis eccentric to that of said outer member, said inner member being rotatable relative to the outer member to provide a plurality of circumferentially-spaced variable volume working chambers between said inner member and the peripheral wall of said cavity and within which combustion periodically takes place during engine operation such that heat is produced in said chambers in a non-uniform manner about the peripheral surface of said inner member, said inner member being hollow to provide a completely closed chamber therein; a liquid cooling medium confined entirely within said hollow inner member so that during engine operation said liquid circulates within the hollow rotor in response to centrifugal forces on the liquid and in response to specific gravity variations throughout the liquid whereby said liquid circulation minimizes temperature differences throughout said inner member.

2. A rotary internal combustion engine as recited in claim 1 in which said inner member has heat radiating fins on an external surface, said fins also functioning during rotation of said inner member to pump cooling air over said surface.

References Cited in the file of this patent

UNITED STATES PATENTS

| | | |
|---|---|---|
| 1,114,564 | Winkler | Oct. 20, 1914 |
| 1,228,806 | Morris | June 5, 1917 |
| 1,753,476 | Richer | Apr. 8, 1930 |
| 1,968,113 | Weaver | July 31, 1934 |

FOREIGN PATENTS

| | | |
|---|---|---|
| 853,807 | France | Dec. 16, 1939 |